UNITED STATES PATENT OFFICE.

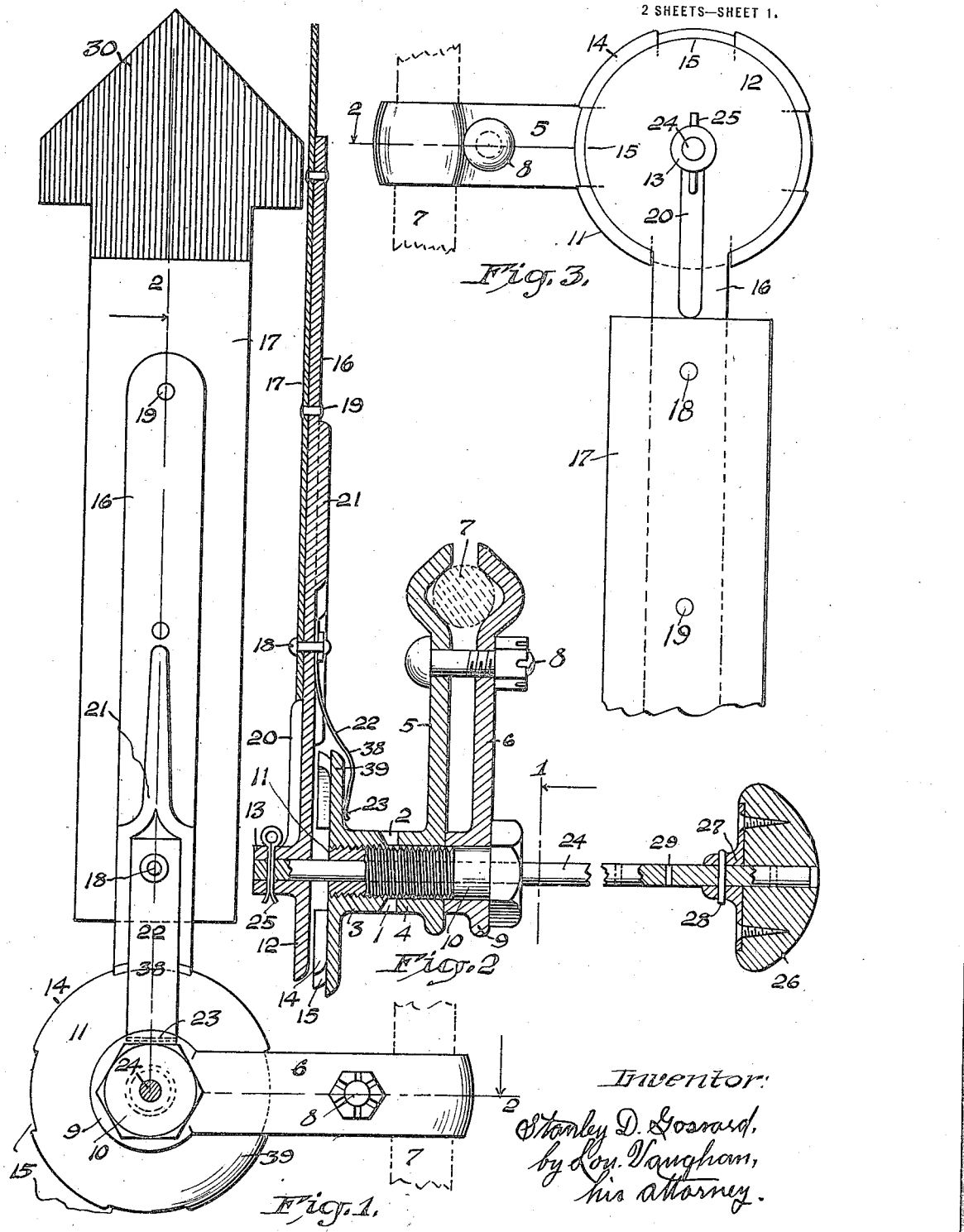

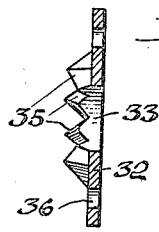
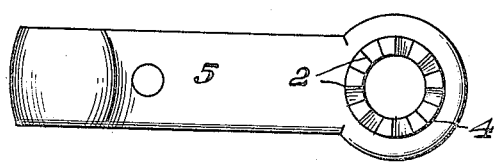
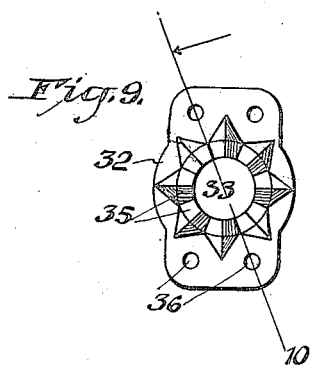
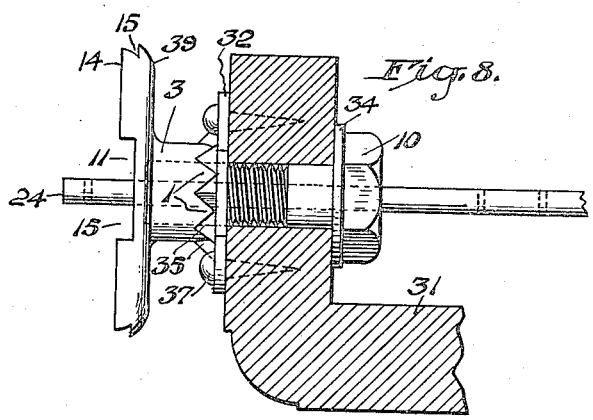
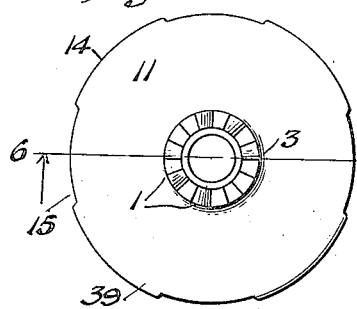
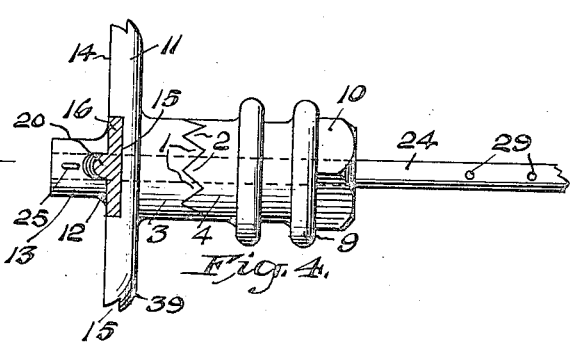
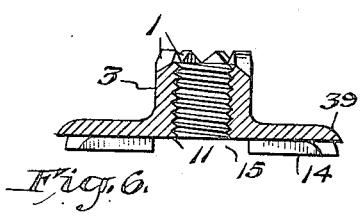

STANLEY D. GOSSARD, OF BLAIR, NEBRASKA.

AUTOMOBILE DIRECTION SIGNAL.

1,427,102. Specification of Letters Patent. Patented Aug. 29, 1922.

Application filed October 27, 1921. Serial No. 510,943.

*To all whom it may concern:*

Be it known that I, STANLEY D. GOSSARD, citizen of the United States of America, residing at Blair, in the county of Washington and State of Nebraska, have invented certain new and useful Improvements in Automobile Direction Signals, of which the following is a specification.

My invention relates to automobile direction signals in which an arrow-headed colored semaphore is mounted on an operating shaft to swing in a plane at right angles to the direction of travel of the vehicle; and is capable of being shifted to and releasably set at a number of radially angular positions each indicating some action in accordance with traffic rules of the road. And among the objects of my invention is to provide efficient means for attaching the signal to any of the varied structures of automobile tops and bodies and in each case to bring the knobbed end of the operating shaft into the most convenient position for the hands of the chauffeur.

Another object is the provision of a sure automatic locking contrivance to retain the semaphore in any of its set angular positions; and to be easily released by the same grasping of the operating handle that is made to turn the shaft and shift the semaphore to any different angle.

A further object is to facilitate adjusting the position of permanent attachment of the signal to the car top, so as to bring the operating selective positions on the semaphore support to the correct radial angles, irrespective of the angular position of the part of the car to which it is attached; whereby a horizontal vertical or inclined part of the car top or the windshield may be utilized as a place of attachment.

And a still further object is the combination of a brake, locking-spring and a yielding stop, to cushion the end of the releasing movement, to prevent the sudden falling of the semaphore from a high position by an accidental or quick release by the operating knob when the signal is pushed to an unlocked position on rough roads; and to insure smooth and certain entrance to the next locking position unless prevented and carried by intentionally by the operator; and to facilitate holding the semaphore at angles intervening the locking positions. These and other structural objects hereinafter more specifically described, I attain by the construction and mechanism illustrated by the accompanying drawings, wherein like references characters indicate the same parts and in which—

Figure 1, is a rear elevation of the signal, arranged and attached to an upright lefthand border stile of a windshield, with the semaphore set vertically up and the rear end of the operating shaft with the knob cut away at the broken line 1 in Figure 2.

Figure 2, a horizontal central section on the broken lines 2 in Figures 1 and 3, with the semaphore set pointing to the righthand.

Figure 3, a front view, the semaphore turned vertically downward and cut away except a fragment of its connected base and hub.

Figure 4, a fragmental left side view, the operating knob and end of the shaft broken away and the semaphore arm, standing horizontally to the left, is cut away near the hub.

Figure 5, a rear end view of the discal, revolubly - adjustable, dished - faced and notched-rimmed semaphore-hub-support and its concentric serrate-ended boss.

Figure 6, an axial section of the supporting hub-seat, taken on the broken line 6 of Figure 5.

Figure 7, a front view of the detached separable front jaw of the attaching clamp.

Figure 8, a top and plan view of the semaphore hub-seat and attaching means fastened to the front lefthand corner post of a closed automobile top, the operating knob and semaphore removed from the shaft.

Figure 9, a front view of the adjustable seat-plate taken alone.

And Figure 10, is an axial section of the seat-plate taken on the broken line 10 in Figure 9.

A stationary discal hub-seat 11 is dished on its front face to form a seat for the discal hub 12 of the semaphore, which has the forwardly projecting concentric tubular boss or central hub 13. The forwardly standing rim 14 of the dished hub-seat is cut away radially to form the four radial notches 15 spaced equally throughout its circumference, to receive the base of the semaphore arm 16, on the periphery of the hub, when the hub is seated, to lock the semaphore in either of these four selective positions. A semaphore plate 17 of size and shape desired is fastened flatwise against the front face of the arm by the rivets 18 and 19. A short longitudinal rib 20 on the front of the base of the arm, and the forked rib 21 on the back, with its branches along the edges of the arm extending inwardly beyond the outer end of said opposite side short rib, strengthen the arm flatwise. (See Figure 2.) Between the edge branches of the rib 21 the outer fixed end of the metal-plate spring 22 is seated and fastened by the rivet 18, see Figures 1 and 2. The spring is of bend flatwise to dispose its free end 23 on the back of the discal support 11, to yieldingly retain the discal semaphore hub 12 seated in the dished face of the support. The spring also serves as a brake during the turning movement of the semaphore and as a cushioned stop for the unlocking endwise movement of the operating shaft, as will be further described under operation.

A central hole through the discal support, extending as an axial bore through the rearwardly projecting tubular boss 3 on the back of the support, is internally threaded. The rearwardly projecting end of this tubular boss is radially corrugated to form the annular row of V-shaped serrations 1. A like reversely projecting integral boss 4 on the base of the outer clamp jaw 5, has with said base a coinciding smooth axial bore. The forwardly projecting end of this boss has radial corrugations forming an annular row of serrations 2, to form a complemental close fitting seat for coupling to the end of the boss on the notched support, as shown in Figures 2 and 4. And there being eight such equal serrations in each annular end row, it is obvious that the support may be seated in eight different radially angular positions, relative to the position of the radial attaching clamp.

The back clamp jaw 6 is disposed parallelly with the jaw 5 and the extended ends of the jaws are reversely crooked to engage any stationary support, as the vertical bar 7, and are gripped thereon by the cross-bolt 8. The base 9 of this jaw has a spacing boss interposed between it and the base of the jaw 5, as shown, and a smooth bore therethrough coinciding with the smooth bore of the base of the opposed jaw. A tubular screw-bolt 10 is disposed through the smooth-bored bases of the jaws and screwed into the internally threaded boss 3 and integral discal support 11. The serrated ends of the bosses being assembled to bring the jaws and radial notches of the dished support seat to the desired relative angles, then the bolt is screwed home to fasten the whole securely together.

The operating shaft 24 is disposed through the tubular bolt 10 to slide endwise and revolve therein. The forward end of the shaft is secured in the hub of the semaphore by the split cotter pin 25. An operating knob 26 is secured to the rear end of the shaft by a hubbed attaching plate 27 on the knob and a cross-pin 28 driven through the hub and through some selected one of the cross-perforations 29 through the shaft; the excess length of shaft being broken off from the rear end at one of the cross-perforations, within the knob.

When the signal is attached to the angle post 31 of a closed automobile top, as shown in Figure 8, an attaching seat-plate 32 is employed. This seat-plate has a smooth central aperture 33 to pass the tubular screw-bolt 10 disposed in a hole through said angle post; the clamping jaws being omitted and a plate washer 34 disposed under the head of the screw-bolt against the inside of the angle post. An annular row of serrations 35 around the central aperture of the seat plate affords, instead of the radially corrugated boss on the omitted front clamping jaw, a complemental seat for the discal hub support; and onto which seat the discal support is firmly drawn by the screw-bolt. In setting the seat plate it is obvious that it may be turned one fourth of a revolution on the screw-bolt, to cross the post as shown in Figure 8, or it may be given smaller turns for any desired closer adjustment. The four outer perforations 36 receive fastening rivets, bolts or fastening screws 37, to prevent it from turning edgewise in use.

In operation the shaft is slid forward to force the discal hub-plate of the semaphore out of the dished seat and the base of the semaphore arm out of a locking notch, to a position as shown in Figure 2. At the stage of the operation here shown the semaphore is free to be turned to any other angular position, only as it is retarded by the spring bearing against the back of the discal seat acting as a sliding brake. If the shaft be thrust farther forward, by the hand grasping its rear end knob, the inner surface of the intermediate bend 38 of the spring will engage the peripheral rounded back edge 39 of the discal seat plate, thus acting as a cushioned stop to the sliding releasing movement and a more strongly acting brake on the revolving movement. In this condition of retarded revoluble movement, the semaphore may be turned and steadily held by the operator at any of the angles intervening the locking positions at the radial notches 15.

By substituting a longer bolt 8 and interposing thick washers between the bases of the clamp jaws, the scope of the clamp is readily increased to embrace much larger or wider supporting parts of the car than that shown at 7.

I claim:

1. An automobile direction signal, comprising a discal semaphore support having a central threaded aperture, an axially-standing flange around said aperture and radial notches through said flange, a tubular attaching screw-bolt disposed in said threaded aperture to engage a sub-support disposed between the bolt head and said semaphore support, an operating shaft of greater length than said tubular bolt, and disposed to slide endwise and revolve therein, a radial semaphore arm rigidly mounted on a projecting end of said shaft to releasably seat in any of said radial notches, and a spring connected to yieldingly retain said semaphore arm seated in said notches.

2. An automobile direction signal, comprising a discal support having a radially notched annular flange on its front and an axial aperture, a tubular attaching screw-bolt threaded in said aperture, an operating shaft of greater length than said screw-bolt disposed therethrough, a radial semaphore arm rigidly mounted on the forward end of said shaft to seat in and be shifted from any radial notch in the annular flange by longitudinal and rotary movements of said shaft, and a plate spring having its outer end fixed on said semaphore arm and its inner free end disposed against the back of said discal support to yieldingly draw said semaphore arm into said radial notches, to serve as a brake during any rotary movement of the shaft and as a cushioned stop for the sliding releasing movement.

3. An automobile direction signal, comprising a tubular screw-bolt, a semaphore support having a central threaded aperture disposed on the threaded end of said screw-bolt and radial notches on its outer face, an attaching clamp having the base of its jaws rotatably mounted on said tubular screw-bolt, a rotatably adjustable coupling connecting said base of the jaws with the semaphore support, an operating shaft disposed through said tubular bolt, a semaphore arm rigidly mounted on the end of said shaft to engage said radial notches, and a spring connected to yieldingly retain the semaphore arm in said notches.

4. An automobile direction signal, comprising a semaphore support having a central threaded aperture, radial notches on its outer face and a concentric serrated boss on its inner face; a tubular screw-bolt having its threaded end screwed into said threaded aperture; a seat plate having a smooth central aperture to receive said tubular screw-bolt, an annular serration to seat said serrated boss and perforations for attaching screws; an operating shaft disposed through said tubular bolt, a semaphore arm rigidly mounted on one end of said shaft to seat in any of said radial notches, and a spring connected to yieldingly retain said semaphore arm seated in said notches.

In testimony whereof I hereunto affix my signature.

STANLEY D. GOSSARD.